(12) United States Patent
Klok

(10) Patent No.: US 6,641,174 B2
(45) Date of Patent: Nov. 4, 2003

(54) SAFETY DEVICE FOR CONNECTING CRYOGENIC FLUID PIPING AND CRYOGENIC FLUID CONTAINER COMPRISING AT LEAST ONE PIPING PROVIDED WITH SUCH A SAFETY DEVICE

(75) Inventor: Cornelis Klok, Noiseau (FR)

(73) Assignee: L'Air Liquide - Societe Anonyme a Directoire et Conseil de Surveillance pour l'Etude et l'Exploitation des Procedes Georges Claude, Paris Cedex (FR)

( * ) Notice: Subject to any disclaimer, the term of this patent is extended or adjusted under 35 U.S.C. 154(b) by 0 days.

(21) Appl. No.: 09/951,635

(22) Filed: Sep. 14, 2001

(65) Prior Publication Data

US 2002/0056992 A1 May 16, 2002

(30) Foreign Application Priority Data

Nov. 15, 2000 (FR) .............................. 00 14721

(51) Int. Cl.⁷ ........................ F16L 35/00; F16L 37/00; F16L 55/00
(52) U.S. Cl. ........................ 285/1; 285/904; 285/914
(58) Field of Search ............................. 285/1, 93, 904, 285/914, 117, 115, 116, 114; 40/316, 673, 661.08, 660; 137/385, 614.02; 403/335, 337, 338

(56) References Cited

U.S. PATENT DOCUMENTS

| | | | |
|---|---|---|---|
| 3,006,181 A | | 10/1961 | Sarti |
| 3,698,742 A | * | 10/1972 | Jones et al. ..................... 285/93 |
| 3,813,733 A | * | 6/1974 | Flohr .......................... 285/117 |
| 3,864,928 A | * | 2/1975 | Eigenbrod ............. 128/201.21 |
| 3,976,095 A | * | 8/1976 | Koch et al. ................. 137/385 |
| 4,108,476 A | * | 8/1978 | Krupp .......................... 285/47 |
| 4,183,562 A | * | 1/1980 | Watkins et al. ............. 285/405 |
| 4,354,522 A | * | 10/1982 | Bormioli ........................ 285/1 |
| 4,397,332 A | | 8/1983 | Sample |
| 4,681,134 A | * | 7/1987 | Paris, Sr. ..................... 137/385 |
| 4,736,765 A | | 4/1988 | Campbell |
| 5,228,474 A | * | 7/1993 | Nimberger ..................... 285/1 |
| 5,623,890 A | * | 4/1997 | Lenske ......................... 285/93 |
| 5,649,724 A | * | 7/1997 | Wiethorn ...................... 285/93 |
| 6,168,209 B1 | * | 1/2001 | Cope et al. ................. 285/914 |

* cited by examiner

Primary Examiner—Lynne H. Browne
Assistant Examiner—Aaron Dunwoody
(74) Attorney, Agent, or Firm—Young & Thompson

(57) ABSTRACT

A device for connecting cryogenic fluid containers includes a connection having screw-threaded connection portions and a flange having at least one pair of openings spaced by a predetermined distance. The device also includes a retaining strap of L shape with two wings cut out in U shape, the front wing also having a pair of openings spaced by the same distance as the openings of the flange. Rivets secure the strap and the flange to each other. The front wing also has a marking identifying the gas corresponding to the distance between openings.

20 Claims, 3 Drawing Sheets

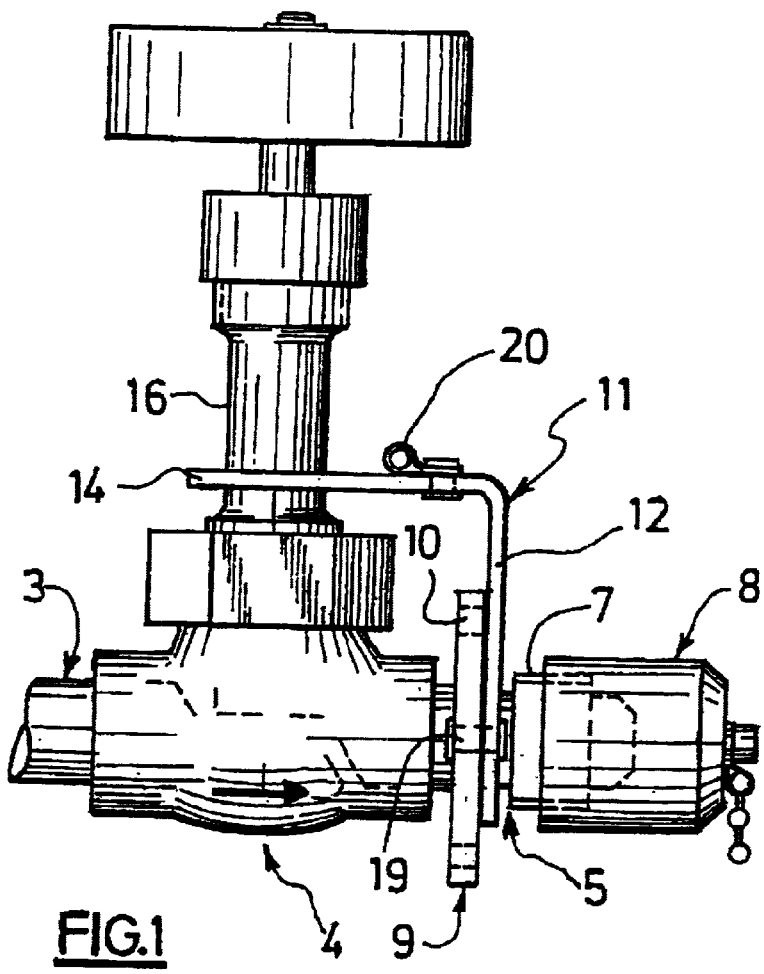
FIG.1
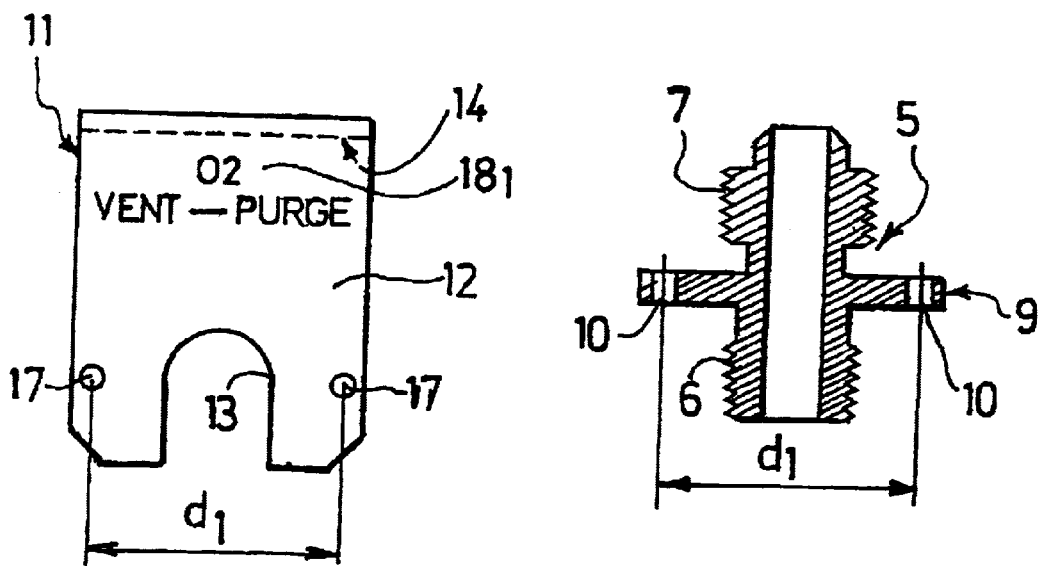
FIG.5
FIG.4

SAFETY DEVICE FOR CONNECTING CRYOGENIC FLUID PIPING AND CRYOGENIC FLUID CONTAINER COMPRISING AT LEAST ONE PIPING PROVIDED WITH SUCH A SAFETY DEVICE

BACKGROUND OF THE INVENTION

The present invention relates to safety devices for the connections of piping for cryogenic fluid, having two screwthreaded connection ends prolonging a central body portion, and more particularly safety devices for piping connections for filling and/or emptying containers of cryogenic fluids.

Cryogenic fluid piping connections are sized differently according to the fluids in question, classified by their type according to their degree of danger, typically either an inert gas such as nitrogen or argon, or oxygen. The connections must be able to be changed in the case of damage or change of the fluid stored in the container, which can give rise to uncontrolled reversals.

SUMMARY OF THE INVENTION

The present invention has for its object to provide a safety device preventing such uncontrolled reversals and permitting reliably and rapidly identifying the different connections thereby limiting the risk of inappropriate connection.

To do this, according to one characteristic of the invention, a portion of the connection body comprises a stay comprising at least one pair of openings spaced a predetermined distance apart, the safety device moreover comprising a retaining member comprising a front portion formed with a pair of openings spaced the same predetermined distance and serving for the securement of the retaining member with the stay, and a rear portion adapted to coact in abutment with an element of said piping on which the connection is mounted.

More particularly:
the retaining member carries a marking
the predetermined distance is selected from a group of at least two different distances, corresponding typically to different types of gases
the marking of the retaining member is associated with one of said predetermined distances.

The present invention also has for its object a container for cryogenic fluid, typically of liquified air gas, comprising at least one piping provided with a safety device as defined above.

BRIEF DESCRIPTION OF THE DRAWINGS

Other characteristics and advantages of the present invention will become apparent from the following description of embodiments, given by way of illustrative but non-limiting example, with respect to the accompanying drawings, in which:

FIG. 1 is a side view of one embodiment of a safety device according to the invention;

FIG. 4 is a longitudinal cross-sectional view of a connection according to the invention;

FIGS. 5 and 6 are front views of two differentiated retaining members according to the invention.

DETAILED DESCRIPTION OF THE PREFERRED EMBODIMENTS

Figure 2:
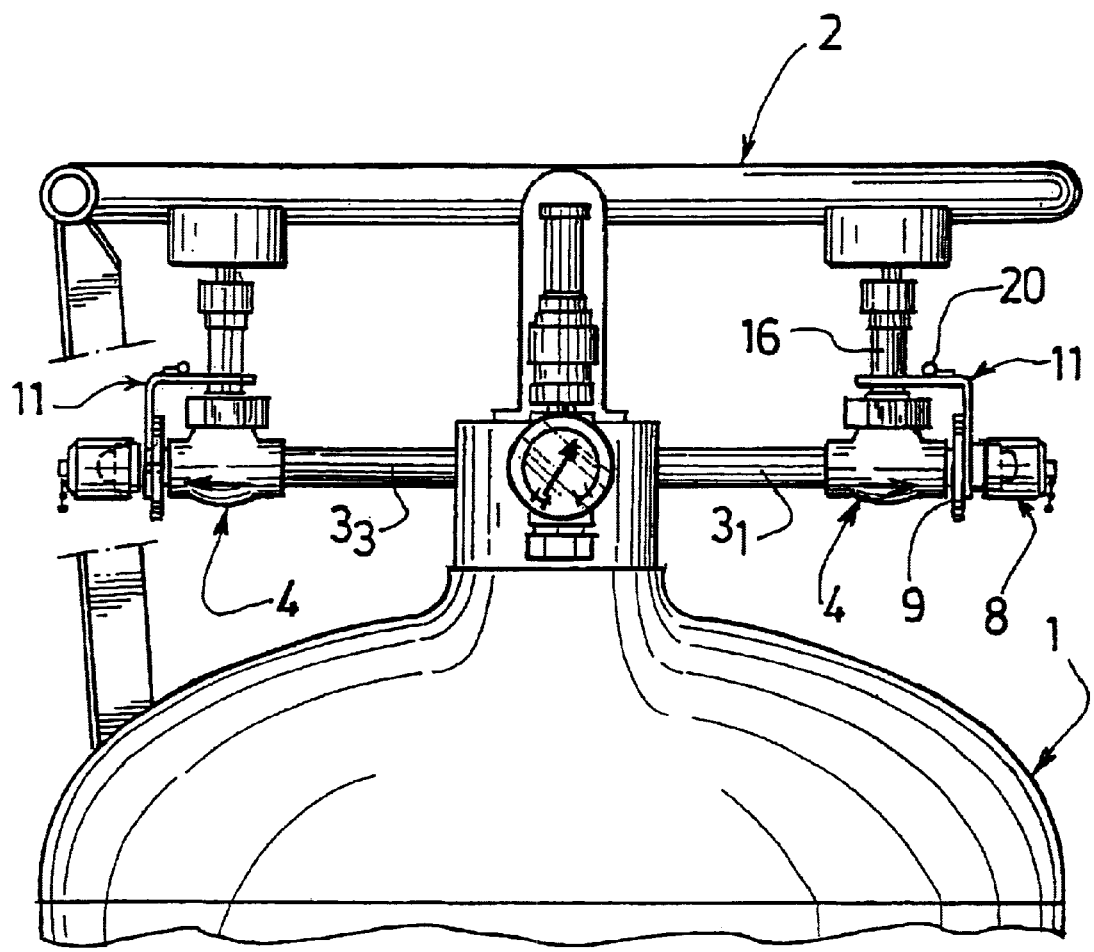
FIGS. 2 and 3 are views respectively from the side and from above of a multi-outlet cryogenic container provided with safety devices according to FIG. 1.
Figure 3:
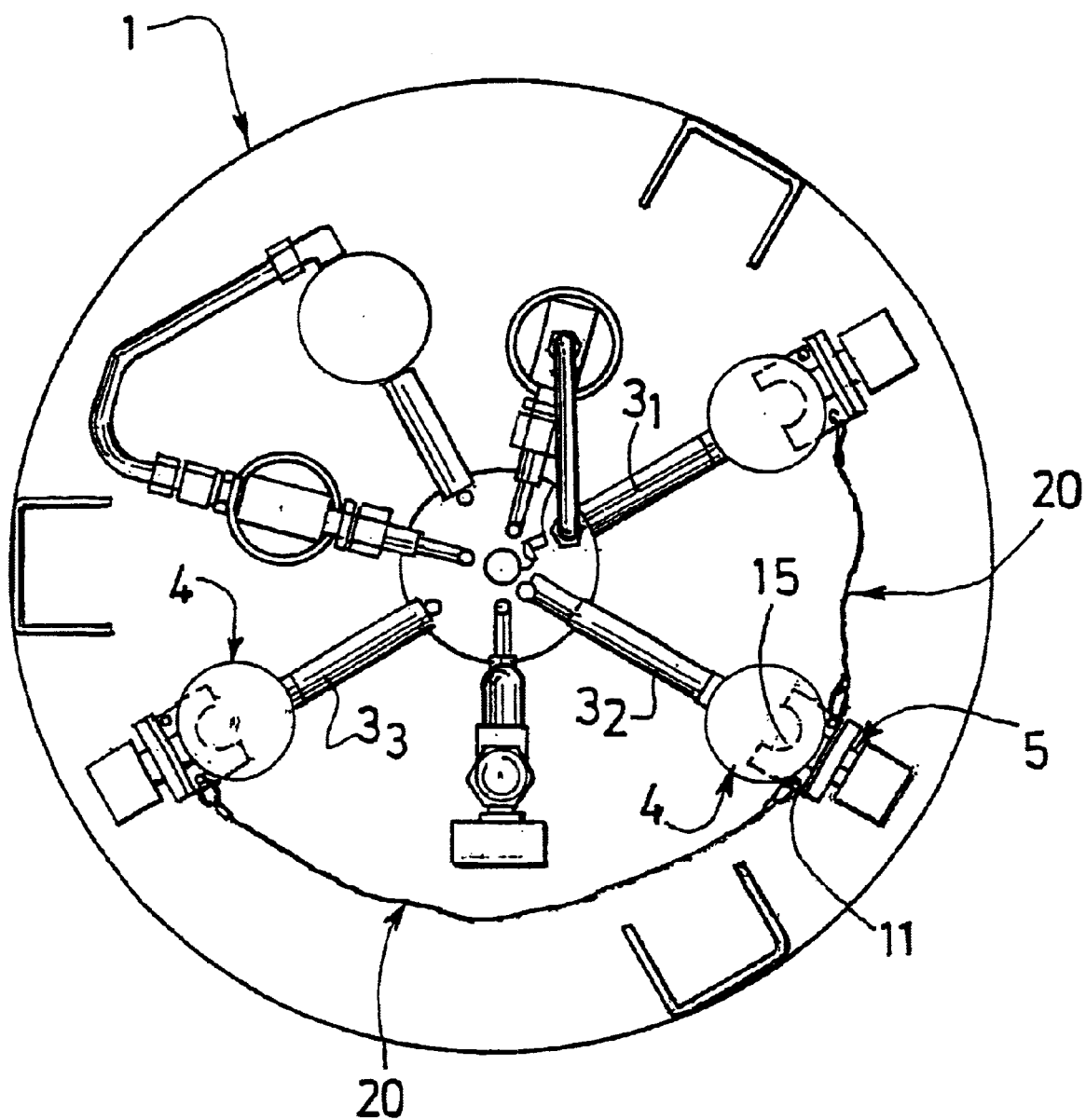

In FIGS. 2 and 3 there is shown a cryogenic fluid container, generally designated by reference numeral 1, comprising in its upper portion, protected by a handling railing 2, several filling or emptying pipes 31, 32, 33 each provided with a control valve 4 for passage of fluid.

As is better seen in FIG. 1, in the end of the valve 4 opposite the pipe 3 is mounted a connection 5 serving for connecting a pipe 3 with external piping (not shown). As is seen in FIG. 4, the connection 5, typically made of brass, comprises a rear screw-threaded portion 6 adapted to be screwed into the valve 4 and a front screw-threaded portion 7 adapted for connection with said external piping and normally protected, before said connection, by a removable cap 8.

According to one aspect of the invention, the connection 5 comprises, between its screw-threaded portions 6 and 7, at least one flange 9 extending radially outwardly and provided with at least one pair (typically two pairs) of through openings 10 spaced by a predetermined distance $d_1$.

The safety device according to the invention comprises on the other hand a retaining member or strap 11, preferably made of stainless steel, having, in the illustrated embodiment, a general L shape with a front wing 12 provided with a U shaped cutout 13 adapted to engage in the clearance of the screw thread 7 of the connection 5, and in front of the flange 9, and a rear wing 14, also provided with a U shaped but wider cutout 15 to surround, in the mounted arrangement, the guide stem of the handle 16 of the valve 4.

According to one aspect of the invention, the front wing 12 of the strap 11 comprises on opposite sides of the U shaped cutout 13, a pair of openings 17 spaced apart the same distance $d_1$ as the pair of openings 10 of the flange 9 of the connection 5.

Figure 6:
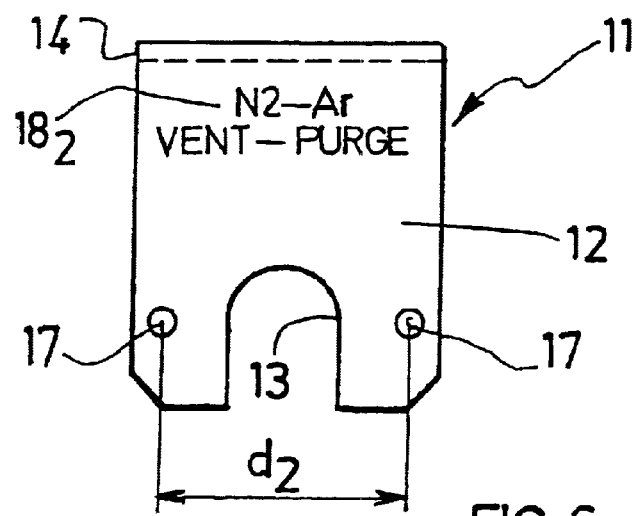

According to another aspect of the invention, the spacing $d_1$ is selected from a group of at least two different spacings, namely typically a spacing $d_1$ for an oxygen connection (FIGS. 4 and 5) and a different spacing $d_2$ for an inert gas such as nitrogen or argon (FIG. 6). To avoid any question of possible erroneous measurement of the spacings $d_1$, each strap 11 comprises a visible marking 18, corresponding to the spacing $d_1$ or a visible marking $18_2$ corresponding to the spacing $d_2$, thereby permitting immediately pairing the strap 11 and the connection 5 corresponding to the type of gas in question.

It will accordingly be understood that, once this pairing has been done, the connection 5 is emplaced by screwing it into the valve 4, the strap 11 is inserted with its U shaped portions surrounding the connection 5 and the valve stem 16 and the connection 5 and the strap 11 are non-removably secured together by rivets 19 inserted through openings 10 and 17 and then compressed, thereby rendering the connection disassembleable only by destruction of the rivets.

In the case of containers 1 provided with a plurality of filling/emptying piping as shown in FIGS. 2 and 3, there will preferably be provided in advance sets of two or three straps 11 for a same type of gas connected to each other by a flexible connection 20 strongly resistant to traction, for example a metallic cable or a bundle of polyamid fibers, thereby limiting the risk of mixing up, in storage bins, straps of different types and avoiding the risk of mounting straps of different groups to a same receptacle.

As mentioned above, the present invention has particular application to contains for liquified air gas, typically oxygen on the one hand, argon and nitrogen on the other hand.

The present invention is however not limited to these embodiments but is adapted to be modified and varied as will become apparent to a person skilled in the art within the scope of the following claims.

What is claimed is:

1. A safety device for cryogenic fluid piping connections, comprising:

a central body portion having a traversing fluid flow passage, first and second screw-threaded ends and a flange portion between said first and second ends, said fluid flow passage extending from the first end to the second end, said flange portion having at least one pair of openings spaced apart by a predetermined distance ($d_1$); and a retaining member having a front part formed with a pair of openings spaced by said predetermined distance ($d_1$) for securing the retaining member to the flange portion, and a rear part arranged and adapted to coact in abutment with an element of said piping connections.

2. The device of claim 1, wherein the rear part extends at an angle relative to the front part.

3. A safety device for cryogenic fluid piping connections, comprising:

a central body portion having a traversing fluid flow passage, first and second screw-threaded ends and a flange portion between said first and second ends, said flange portion having at least one pair of openings spaced apart by a predetermined distance ($d_1$); and a retaining member having a front part formed with a pair of openings spaced by said predetermined distance ($d_1$) for securing the retaining member to the flange portion, and a rear part arranged and adapted to coact in abutment with a valve.

4. The device of claim 1, wherein the rear part of the retaining member is substantially U-shaped to accommodate a portion of the element of said piping connections.

5. The device of claim 1, wherein the retaining member bears a marking.

6. The device of claim 5, wherein the predetermined distance ($d_1$) is selected from a group of at least two predetermined different distances.

7. The device of claim 6, wherein the marking is associated with one of said at least two predetermined different distances.

8. A cryogenic fluid container comprising at least one piping provided with a safety device according to claim 1.

9. The container of claim 8, comprising at least two conduits, each conduit having said safety device, the retaining member of each said safety device being interconnected by a flexible link.

10. The container of claim 8 containing an air gas.

11. A safety device for connecting cryogenic piping, comprising:

a connection member having a central body between first and second threaded ends, said central body having a traversing fluid flow passage and a flange with at least one pair of spaced apart openings through said flange; and an L-shaped retaining member having a first leg with at least one pair of openings for securing said retaining member to said flange and a second leg for engaging a component of said piping, wherein a marking on said retaining member indicates that said at least one pair of spaced apart openings in said connection member and said at least one pair of openings in said retaining member are connectable.

12. The device according to claim 11, wherein the connection member and the retaining member are non-removably secured by rivets.

13. The device according to claim 11, wherein the markings indicate a liquefied gas.

14. The device according to claim 11, further comprising a flexible connection for connecting a plurality of like retaining members to each other.

15. The device according to claim 11, further comprising a removable cap for capping off one of said first and second threaded ends when said device is in a non-use position.

16. The device of claim 3, wherein the rear part extends at an angle relative to the front part.

17. The device of claim 3, wherein the rear part of the retaining member is substantially U-shaped to accommodate a portion of the element of said piping connections.

18. The device of claim 3, wherein the retaining member bears an identifying marking.

19. The device of claim 18, wherein the predetermined distance ($d_1$) is selected from a group of at least two predetermined different distances.

20. The device of claim 19, wherein the marking is associated with one of said at least two predetermined different distances.

* * * * *